(12) United States Patent
Champ

(10) Patent No.: US 6,935,626 B2
(45) Date of Patent: Aug. 30, 2005

(54) SPRING ASSEMBLY

(75) Inventor: Larry Brian Champ, Cairo, MO (US)

(73) Assignee: Orscheln Products LLC, Moberly, MO (US)

(*) Notice: Subject to any disclaimer, the term of this patent is extended or adjusted under 35 U.S.C. 154(b) by 25 days.

(21) Appl. No.: 10/205,783

(22) Filed: Jul. 26, 2002

(65) Prior Publication Data

US 2004/0017031 A1 Jan. 29, 2004

Related U.S. Application Data

(60) Provisional application No. 60/307,760, filed on Jul. 25, 2001.

(51) Int. Cl.[7] .................................................. F16C 1/10
(52) U.S. Cl. .......................... 267/70; 267/166; 188/2 D; 188/167; 74/501.5 R; 74/502.4
(58) Field of Search ................................ 188/2 D, 166, 188/167; 267/70, 71, 166, 166.1; 74/501.5 R, 502.4, 502.5, 500.5, 502.6

(56) References Cited

U.S. PATENT DOCUMENTS

| | | | | |
|---|---|---|---|---|
| 972,434 A | * | 10/1910 | Blomberg | 251/337 |
| 3,435,165 A | * | 3/1969 | Lombard | 200/61.89 |
| 4,351,418 A | * | 9/1982 | Woodring et al. | 188/24.22 |
| 4,854,185 A | * | 8/1989 | Lichtenberg et al. | 74/501.5 R |
| 5,339,783 A | * | 8/1994 | Teichert | 123/400 |
| 5,613,405 A | * | 3/1997 | Kelley et al. | 74/502.4 |
| 6,272,948 B1 | * | 8/2001 | Klippert | 74/500.5 |

* cited by examiner

Primary Examiner—Robert A. Siconolfi
Assistant Examiner—Bradley T King
(74) Attorney, Agent, or Firm—Michael K. Boyer

(57) ABSTRACT

The disclosure relates to a spring assembly for use in a parking brake system that solves problems associated with conventional parking brake systems. The disclosed spring assembly imparts a minimum force (e.g., tensile force) onto the parking brake cable of the parking brake system when the parking brake is applied. The spring assembly comprises a sliding collar, a wire ring located about the exterior diameter of the sliding collar, a locking collar, a spring and a sleeve for receiving the aforementioned components.

16 Claims, 3 Drawing Sheets

SPRING ASSEMBLY

The subject matter herein claims benefit of prior filed U.S. patent application Ser. No. 60/307,760, filed on Jul. 25, 2001 and entitled "Spring Assembly"; the disclosure of which is hereby incorporated by reference.

FIELD OF THE INVENTION

The instant invention relates to a spring assembly for use in a parking brake system in order to maintain a minimum load or tension in a parking brake cable.

BACKGROUND OF THE INVENTION

Spring accumulators can be employed in parking brake systems. An example of a conventional spring accumulator is disclosed in U.S. Pat. No. 5,232,207 (issued Aug. 3, 1993); hereby incorporated by reference.

Parking brake systems can be employed at any suitable location on a vehicle. Examples of such locations comprise drive lines or shafts, wheel brakes, drum brakes, servo actuated brakes, among other types and locations. Parking brake systems typically include a parking brake cable that is either electrically or manually actuated by applying a tensile force to a cable strand (which also applies a compressive force to the surrounding cable conduit). This force is in turn applied to the parking brake system that causes a frictional material (e.g., brake pad) to engage thereby maintaining the vehicle in a predetermined position. The angle and orientation (i.e., up or down hill) at which a vehicle is parked as well as the overall weight of the vehicle (including any payload) can affect operation of the parking brake system. There is a need in this art for a parking brake system having a preloaded force or minimum tension in the parking brake cable in order to minimize such affects on the parking brake system.

SUMMARY OF THE INVENTION

The instant invention relates to a spring assembly for use in a parking brake system that solves minimum force problems associated with conventional parking brake systems. The inventive assembly imparts a minimum force (e.g., tensile force) onto the parking brake cable of the parking brake system when the parking brake is applied. This minimum force improves the effectiveness of the parking brake system (e.g., when the vehicle is parked at an angle or carrying relatively large loads). This minimum force can be used for 1) reducing, if any eliminating, any vehicle roll-forward or backward, 2) increasing the force applied to the parking brake cable, 3) maintaining a force within a parking brake cable, 4) maintaining the minimum force required in the brake without requiring excessive force, among other benefits.

The inventive spring assembly can be employed upon a wide range of vehicles. Examples of such vehicles comprises DOT Class 5–7. In the case of DOT Class 5–7 vehicles, the inventive spring assembly is normally employed in conjunction with a drive line parking brake system.

The inventive spring assembly comprises a sliding collar, a wire ring located about the exterior diameter of the sliding collar, a locking collar, a spring and a sleeve for receiving the aforementioned components. The size of these components depends upon the size and function of the vehicle, and type and size of a parking brake cable (or strand) and parking brake system.

Figure 1A:
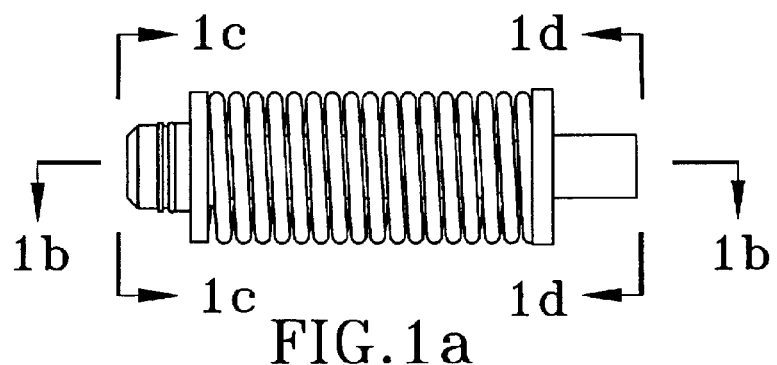
FIGS. 1A–D show the inventive spring assembly in an assembled configuration.
Figure 1B:
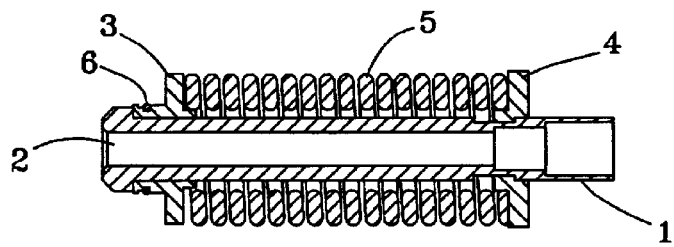
Figure 1C:
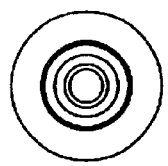
Figure 1D:
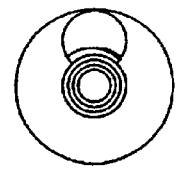

All dimensions show on the drawings are for purposes of illustration only, and such components can vary in size and exact configuration depending upon the parking brake system in which they are employed.

DETAILED DESCRIPTION

The instant invention relates to a spring assembly that applies a minimum tensile load or force upon a cable or strand. The spring assembly comprises a sleeve that is dimensioned for receiving a first (e.g., sliding) and a second (e.g., locking) collar. A spring is maintained between the collars. A cable or strand extends into and through the sleeve. A wire ring around the sliding collar prevents the sliding collar from disengaging a bracket that determines the location of the spring assembly (e.g., the sliding collar is inserted through an opening in the bracket such that the bracket is maintained between the wire and sliding collar). When an end portion of the cable or strand that extends through the spring assembly is affixed to an apparatus for operating the cable (e.g., foot pedal or over center lever), the spring applies a force against the locking collar and in direction opposite from the cable operating apparatus thereby increasing the tensile load in the cable or strand.

Certain aspects of the inventive assembly are illustrated by reference to the Drawings. Referring now to the Drawings, FIGS. 1A–1D illustrate the inventive spring assembly in an assembled configuration. FIGS. 1A–1D illustrate the sliding collar (with its wire ring), spring and locking collar all located about the exterior surface and along the longitudinal axis of the sleeve. The spring is at least partially compressed between the sliding collar and the locking collar. The maximum travel position of the sliding collar and spring along the length of the sleeve are defined by edges on the sleeve. The travel position of the sliding collar relative to the locking collar also defines the degree to which the spring is compressed, and in turn the force that is available for application to the parking brake cable of the parking brake system.

FIGS. 1A through 1D illustrate one aspect of the inventive spring assembly in an assembled configuration. A sleeve 1 defining an opening or bore 2 extending along the longitudinal axis of sleeve 1. Sliding collar 3 and locking collar 4 are received about sleeve 1. A spring 5 is maintained between collars 3 and 4 in a compressed state. A wire 6 affixes sliding collar 3 to a mounting bracket (not shown).

The spring (and associated or related components) can be of any suitable size and application force. The application force can range from about 100 to at least about 1,000 pounds (e.g., 150 to 500 pounds). The specific size will vary depending upon the vehicle and mounting brackets associated with the spring assembly.

Figure 2A:
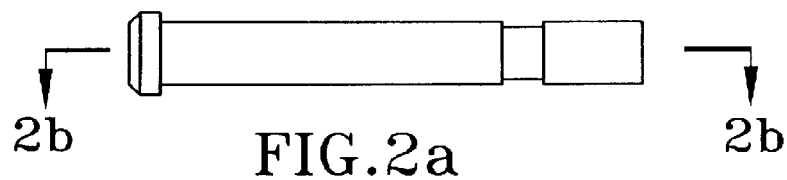
FIGS. 2A–B show the sleeve component of the assembly illustrated in FIGS. 1A–1D.
Figure 2B:
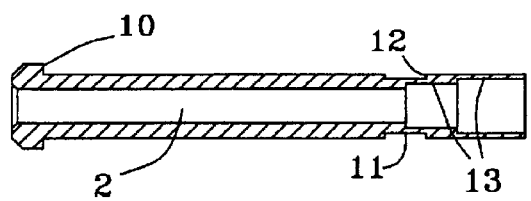

FIGS. 2A–B show the sleeve component of the assembly illustrated in FIGS. 1A–1D. The sleeve defines edges for determining the maximum travel distance of the sliding collar and provide mating surfaces for engaging the collars. The enlarged exterior diameter and edge illustrated on the left hand side of FIGS. 2A–B are associated with the sliding collar. The sliding collar (and its wire ring) are installed by being slid from the right hand side of the sleeve along the length of sleeve until engaging the enlarged exterior diameter. The spring is then installed in a similar manner. If desired, the sliding collar can be connected to the sleeve by employing an e-clip, among other retainers.

FIGS. 2A and 2B illustrate the sleeve 1 shown in FIGS. 1A through 1D. Sleeve 1 defines a circular edge or shoulder area 10 about the circumference of sleeve 1. Edge 10 is dimensioned to provide a mating surface to engage sliding collar 3 thereby preventing sliding collar 3 from passing over area 10. Sleeve 1 also defines a circular recessed slot or groove 11 about the exterior of sleeve 1. Groove 11 defines an edge 12 that provides a mating surface for engaging locking collar 4. The exterior diameter of sleeve 1 is greater than the smaller of the two openings defined on locking collar 4 thereby prevent locking collar 4 from traveling past edge 12. Sleeve 1 defines area 13 that is dimensioned to mate with and receive a conduit end fitting of a cable or strand assembly (not shown). The portion of area 13 having the greatest diameter contacts the conduit end fitting and the portion of area 13 having the smallest diameter can be engaging for seating a seal. The conduit end fitting surrounds an end portion of the cable or strand. The conduit end fitting cannot travel beyond area 13 whereas the cable or strand extends along bore 2 and exits sleeve 1.

Figure 3A:
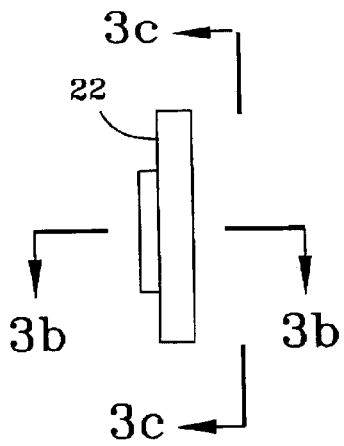
FIGS. 3A–3C show the locking collar component of the assembly illustrated in FIGS. 1A–1D.
Figure 3B:
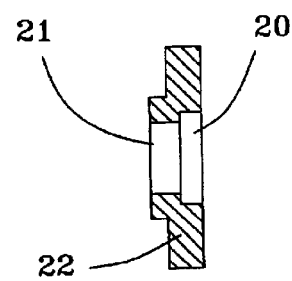
Figure 3C:
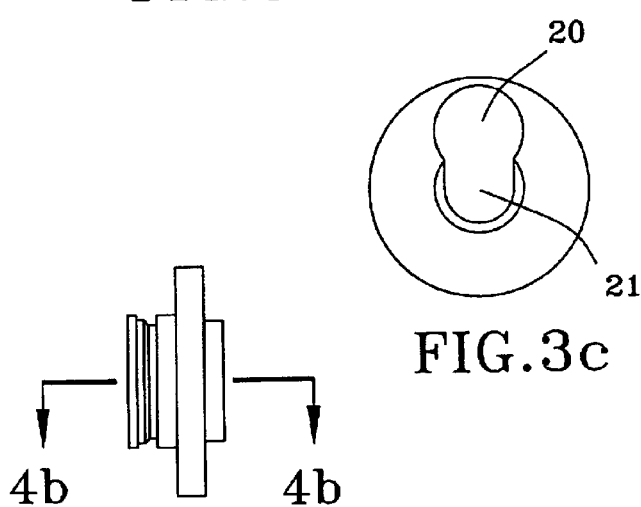

FIGS. 3A–3C show the locking collar component of the assembly illustrated in FIGS. 1A–1D. The locking collar defines an annular exterior surface for receiving the spring. The locking collar defines overlapping openings for receiving the sleeve. The first and larger opening permits the locking collar to slide over the exterior dimension of the sleeve shown on the right hand side of FIGS. 2A–2B. As the locking collar travels along the longitudinal axis of the sleeve, the spring is compressed between the locking collar and the previously installed sliding collar. When the locking collar has compressed the spring to the extent desired, the locking collar is moved perpendicularly such that the second and smaller opening defined in the locking collar engages the sleeve. This engagement positions the locking collar about the sleeve and maintains the spring in an at least partially compressed state. The spring can be compressed further by applying the parking brake cable of the parking brake system. The sleeve is dimensioned to receive a locking collar. The locking collar has two openings. One is large enough to permit the locking collar to receive the exterior diameter of the sleeve shown on the right hand side of FIGS. 2A–B. The second opening defined in the locking collar receives the reduced exterior diameter of the sleeve adjacent to the exterior diameter of the sleeve shown on the right hand side of FIGS. 2A–B. The exterior dimensions of the sleeve compliment the interior dimensions of the openings defined in the locking collar (shown in FIGS. 1A–1D and described in greater detail in connection with FIGS. 3A–3C infra). The interior dimension of the right hand side of the sleeve is configured so as to receive a conduit end fitting of a parking brake cable. The strand of the parking brake cable extends from the conduit end fitting and passes through the sleeve within an interior channel or a groove defined within the sleeve (described in greater detail in connection with FIG. 5 infra). In an alternative aspect of the invention, the sleeve and locking collar comprise an integral component. Further, if desired, the locking collar can be connected to the sleeve by employing an e-clip, among other retainers.

FIGS. 3A through 3C illustrate locking collar 4 having first and second openings 20 and 21. The diameter of opening 20 is larger than and not concentric with opening 21. Opening 21 engages groove 11 and edge 12 of sleeve 1. Locking collar 4 defines includes an annular or a circular surface 22 for engaging spring 5.

Figure 4A:
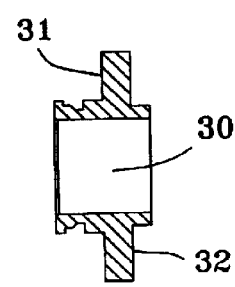
FIGS. 4A–4C show the sliding collar component of the assembly illustrated in FIGS. 1A–1D.
Figure 4B:
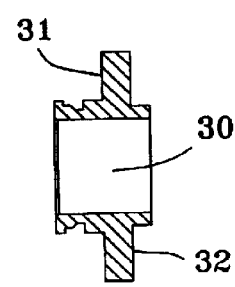
Figure 4C:
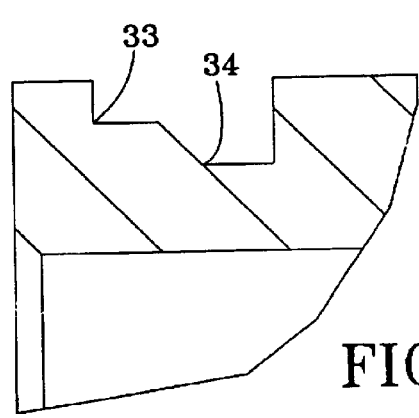

FIGS. 4A–4C show the sliding collar component of the assembly illustrated in FIGS. 1A–1D. The interior surface of the sliding collar defines an opening for receiving the sleeve and permitting the sliding collar to move along the length of the sleeve. The sliding collar component includes an annular ring about the exterior diameter of the collar. The right hand side of the annular ring contacts the spring in a manner sufficient to compress the spring between the sliding collar and the previously described locking collar. The left hand side of the annular ring contacts a mounting bracket or plate for the inventive spring assembly. The exterior surface of the sliding collar also defines two grooves or channels for receiving a wire ring (the wire ring is typically a discontinuous loop), snap ring, e-clip, among other retainers. The wire ring can be moved between the two grooves. The placement of the wire ring within the two channels depends upon whether the inventive spring assembly has been installed in or against its mounting bracket. The mounting bracket or plate is positioned between the wire ring and the previously described left hand side of the annular ring. When the spring assembly is connected to the mounting bracket or plate, the wire ring is displaced from the groove having the larger diameter to the groove having the smaller diameter. As a result, the spring assembly wire ring functions to attach the spring assembly to the mounting bracket.

FIGS. 4A through 4C illustrate sliding collar 3 having an opening 30 for receiving sleeve 1. Sliding collar 3 defines mating surface 31 for engaging edge 10 of sleeve 1. Sliding collar 3 also defines mating surface 32 for engaging spring 5 (thereby positioning spring 5 between the locking and sliding collars). Circular grooves 33 and 34 are defined about an exterior surface of collar 3. These grooves are employed for retaining wire 6 in its engaged and disengaged positions. Circular groove 33 retains the wire 6 in its disengage position whereas groove 34 retains the wire in its engaged position (i.e., for connecting sliding collar 3 to a mounting bracket).

Figure 5:
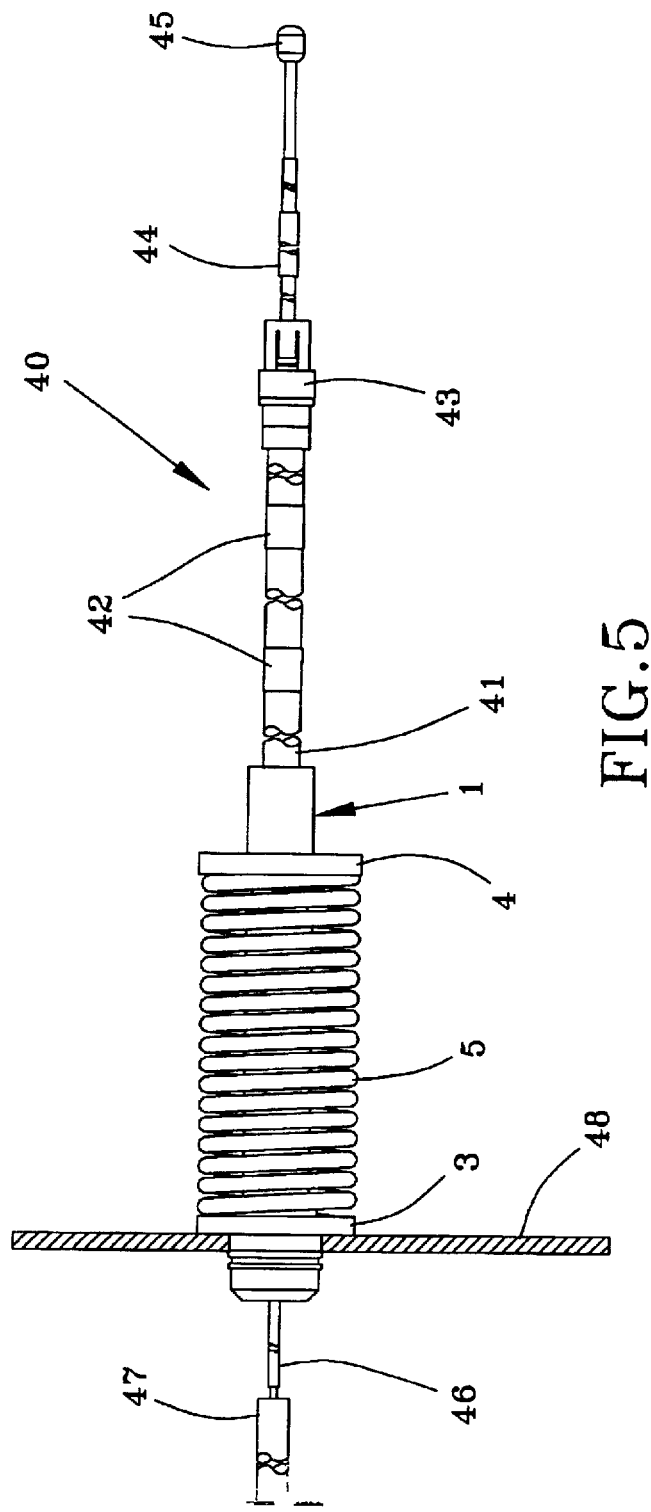
FIG. 5 shows the spring assembly illustrated in FIGS. 1A–1D in an installed configuration including a cable.

FIG. 5 shows the spring assembly illustrated in FIGS. 1A–1D in an installed configuration including a cable. The parking brake cable shown can be of any suitable length and size depending upon the dimensions and weight of the vehicle. The cable comprises an exterior conduit and an interior strand. The cable includes a conduit end fitting that is received within the interior opening defined on the right hand side of the previously described sleeve. The strand within the conduit extends beyond the conduit end fitting and travels along the length of the sleeve and exits the sleeve on the left hand side of the sleeve. If desired, the parking brake cable can include one or more additional fittings for mounting the cable onto the vehicle (e.g., refer to item 48 in FIG. 5). The strand can also include a button (e.g., a zinc die-cast member) that defines the terminal end of the strand. This button also functionally engages either a member for applying a load (e.g., manual or electrically applied parking brake lever), or the parking brake system. Applying or releasing tensile forces in the cable causes the strand to move within the conduit thereby engaging or disengaging the parking brake system (e.g. drive line brake).

FIG. 5 illustrates spring assembly of FIG. 1 associated with a cable or strand assembly 40. Assembly 40 comprises conduit 41, protective straps 42 (that can be contacted by clamps, not shown, when installing the assembly), snap fitting 43 (e.g., such as illustrated in U.S. Pat. No. 4,131,379; hereby incorporated by reference), polyethylene sheath 44, radius or end button 45, strand 46, and threaded end fitting 47. End button 45 is received within a conventional parking brake apparatus (not shown) wherein operation of assembly 40 causes displacement of button 45 and in turn causes a brake apparatus to engage or release. The threaded end fitting 47 is connected to either another cable or directly to a system (e.g., foot pedal, over center lever, etc.) for operating assembly 40. Assembly 40 is positioned at a predetermined location upon a vehicle and supported by bracket 48. Bracket 48 can have any suitable configuration so long as it defines an opening, depression, cavity or other configuration for receiving the spring assembly.

The components of the inventive spring assembly can be fabricated by using any suitable methods. One example comprises employing conventional screw machine techniques. The components can be fabricated from conventional materials such as 12L14 steel, spring steel, among other materials.

While the above Description places particular emphasis on a spring assembly for usage in a vehicular parking brake system, the inventive spring assembly can be employed in a wide range of applications wherein it is desirable to preload or maintain a minimum force in a mechanical system.

The following is claimed:

1. A spring assembly for a cable actuated system comprising a spring compressed between a sliding collar and a locking collar, and a sleeve wherein the sliding collar, locking collar and spring are disposed about the sleeve and the sleeve defines at least one groove for engaging the locking collar wherein said sleeve defines an opening for receiving a cable or strand and wherein said locking collar defines two overlapping and non-concentric openings wherein one of the openings is dimensioned to receive a first exterior diameter of the sleeve and one of the openings is dimensioned to receive an exterior diameter of said groove, wherein the second exterior diameter is less than the first diameter.

2. An assembly for applying tension to a cable or strand comprising a first collar, a ring located about the exterior diameter of the first collar, a second collar defining two non-concentric openings, a spring located between the first and second collars and a sleeve wherein the first collar, second collar and spring are located about the exterior of the sleeve; wherein said sleeve defines an opening for receiving the cable or strand and wherein one of the non-concentric openings is dimensioned to receive a first exterior diameter of the sleeve and one of the openings is dimensioned to receive a second exterior diameter of the sleeve, wherein the second exterior diameter is less than the first diameter.

3. The assembly of claim 2 wherein said sleeve defines a groove for engaging the second collar.

4. The assembly of claim 2 wherein the first collar defines a channel for receiving a wire.

5. The assembly of claim 2 further comprising a cable or strand extending through said sleeve.

6. The assembly of the claim 1 wherein said sliding collar defines a groove to receive a retainer.

7. The assembly of claim 6 wherein said retainer comprises a wire ring located about the exterior diameter of the sliding collar.

8. An assembly for applying tension to a cable comprising a strand surrounded by a conduit said assembly comprising a first collar, a second collar that defines two overlapping and non-concentric openings, a spring compressed between the first and second collars, and a sleeve; wherein the first collar, second collar and spring are located about the exterior of the sleeve and said first collar slidably engages the sleeve and the sleeve defines a groove for defining the location of the second collar; wherein said sleeve defines an interior passage for receiving the cable and a surface for engaging the conduit.

9. The assembly of claim 8 wherein the strand extends through the passage.

10. The assembly of claim 8 wherein the first collar defines a channel for receiving a wire.

11. The assembly of claim 1 wherein the sleeve defines a groove for engaging the locking collar.

12. The assembly of claim 2 wherein the first and second collars define surfaces for contacting and compressing the spring therebetween.

13. The assembly of claim 8 wherein the first and second collars define surfaces for contacting and compressing the spring therebetween.

14. The assembly of claim 8 wherein said sleeve defines a groove for engaging the second collar.

15. The assembly of claim 8 wherein one of the overlapping and non-concentric openings is dimensioned to receive an exterior diameter of the sleeve and one of the openings is dimensioned to receive said groove, wherein the second exterior diameter is less than the first diameter.

16. An assembly for applying tension to a cable or strand comprising a first collar, a ring located about the exterior diameter of the first collar, a second collar defining two non-concentric openings, a spring located between the first and second collars and a sleeve wherein the first collar, second collar and spring are located about the exterior of the sleeve; wherein said sleeve defines an opening for receiving the cable or strand and wherein one of the openings defined in the second collar is dimensioned to receive a first exterior diameter of the sleeve and one of the openings is dimensioned to receive a second exterior diameter of the sleeve, wherein the second exterior diameter is less than the first diameter.

* * * * *